US008564991B2

(12) United States Patent
Zhang et al.

(10) Patent No.: US 8,564,991 B2
(45) Date of Patent: Oct. 22, 2013

(54) ENHANCED ONE CYCLE CONTROL FOR POWER FACTOR CORRECTION

(75) Inventors: Yong Zhang, Nanjing (CN); Peng Cai, Nanjing (CN)

(73) Assignee: Astec International Limited, Kwun Tong, Kowloon (HK)

( * ) Notice: Subject to any disclaimer, the term of this patent is extended or adjusted under 35 U.S.C. 154(b) by 1022 days.

(21) Appl. No.: 12/176,102

(22) Filed: Jul. 18, 2008

(65) Prior Publication Data

US 2010/0014329 A1    Jan. 21, 2010

(51) Int. Cl.
*H02M 5/42* (2006.01)
*H02M 7/04* (2006.01)
*H02M 7/68* (2006.01)
*G05F 1/24* (2006.01)

(52) U.S. Cl.
USPC .............................................. 363/89; 323/259

(58) Field of Classification Search
USPC ......... 323/222, 223, 224, 282, 283, 284, 259; 363/89
See application file for complete search history.

(56) References Cited

U.S. PATENT DOCUMENTS

| 4,937,722 A | * | 6/1990 | Deierlein ........................ 363/89 |
| 4,974,141 A | * | 11/1990 | Severinsky et al. ............. 363/89 |
| 5,278,490 A | | 1/1994 | Smedley |
| 5,355,294 A | * | 10/1994 | De Doncker et al. ........... 363/17 |
| 5,438,505 A | | 8/1995 | Cohen |
| 5,642,267 A | * | 6/1997 | Brkovic et al. ................ 323/224 |
| 5,867,379 A | * | 2/1999 | Maksimovic et al. ........ 323/222 |
| 5,886,586 A | | 3/1999 | Lai et al. |
| 6,034,513 A | * | 3/2000 | Farrington et al. ............ 323/222 |
| 6,215,287 B1 | * | 4/2001 | Matsushiro et al. ........... 323/222 |
| 6,307,361 B1 | * | 10/2001 | Yaakov et al. ................. 323/288 |
| 6,388,429 B1 | * | 5/2002 | Mao ............................... 323/222 |
| 6,469,917 B1 | * | 10/2002 | Ben-Yaakov .................... 363/44 |
| 6,728,121 B2 | * | 4/2004 | Ben-Yaakov et al. ............ 363/89 |
| 6,944,034 B1 | * | 9/2005 | Shteynberg et al. ........ 363/21.13 |
| 7,161,816 B2 | * | 1/2007 | Shteynberg et al. ........ 363/21.13 |
| 7,737,668 B2 | * | 6/2010 | Oswald et al. ................. 323/259 |
| 2006/0002155 A1 | * | 1/2006 | Shteynberg et al. ........ 363/21.12 |
| 2006/0113975 A1 | * | 6/2006 | Mednik et al. ................. 323/282 |

OTHER PUBLICATIONS

"Integrators in Pulse Width Modulation," K.M. Smedley; IEEE 1996; pp. 773-781.
"Power Factor Correction With Flyback Converter Employing Charge Control," W. Tang, Y. Jiang, G.C. Hua and F.C. Lee; IEEE 1993; pp. 293-298.
"High Power Factor Preregulator for Off-Line Power Supplies," Lloyd Dixon; Unitrode Seminor; 1998; 17 pgs.
"A Combined Buck and Boost Power-Factor-Controller for Three-Phase Input," B. Fuld, S. Kern and R.B. Ridley; 1993; pp. 144-148.

(Continued)

*Primary Examiner* — Jue Zhang
(74) *Attorney, Agent, or Firm* — Harness, Dickey & Pierce, P.L.C.

(57) ABSTRACT

A method of controlling a power factor correction (PFC) converter that has a discontinuous input current includes sensing the input current, sensing an output voltage and controlling a duty cycle of at least one switch in the converter in response to the sensed input current and output voltage using a control equation for controlling the duty cycle of the switch such that an average input current to the converter is sinusoidal. Example circuits capable of performing the method are also disclosed.

19 Claims, 11 Drawing Sheets

(56) References Cited

OTHER PUBLICATIONS

"Analysis and Design of a Wide Input Range Power Factor Correction Circuit for Three-Phase Applications," R. Ridley, S. Kern and B. Fuld; 1993; pp. 299-305.

"Charge Control: Modeling, Analysis, and Design," W. Tang, F.C. Lee, R. B. Ridley and I. Cohen; IEEE 1993; pp. 396-403.

"Develop a Single Phase Power Factor Correction Control Chip," K. Smedley and C. Qiao; 1997-1998; 4 pgs.

* cited by examiner

ENHANCED ONE CYCLE CONTROL FOR POWER FACTOR CORRECTION

FIELD

The present disclosure relates to control schemes for power converters.

BACKGROUND

The statements in this section merely provide background information related to the present disclosure and may not constitute prior art.

Various switching power converter topologies, for example buck converters, boost converters and buck-boost converters, are used as power factor correction (PFC) converters. PFC converters are used, among other reasons, to increase the power factor of a power converter so that the ratio of actual power consumed by the converter to the apparent power consumed by the converter approaches one. PFC converters are frequently used as the first stage in a multi-stage power supply. PFC converters can, however, also be used as a single stage power converter without additional stages.

Numerous control schemes for switching power converters, including PFC converters, have been proposed and used over the years. These control schemes have various benefits and drawbacks known to those in the art.

SUMMARY

According to one aspect of the present disclosure, a method is provided for controlling a power factor correction (PFC) converter that has a discontinuous input current. The method includes sensing the input current, sensing an output voltage from the converter, and controlling a duty cycle of at least one switch in the converter in response to the sensed input current and output voltage according to a predetermined control equation such that an average input current to the converter is sinusoidal.

According to another aspect of the present disclosure, a power factor correction (PFC) circuit includes a switching power converter having an input current and producing an output voltage, the converter including at least one switch, and a control circuit operable to control a duty cycle of the switch according to a predetermined control equation such that an average of the input current is sinusoidal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
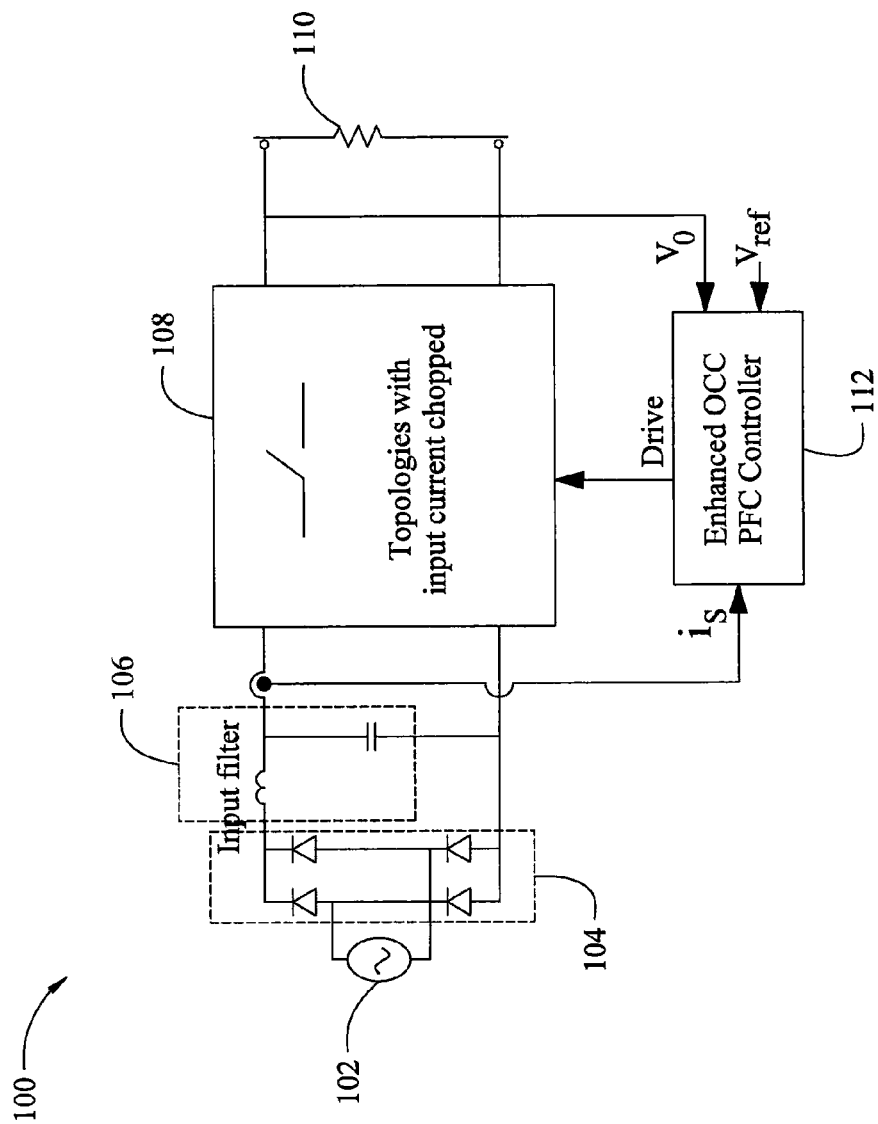
FIG. 1 is a diagram of an example PFC converter including a switching converter circuit and a control circuit.

The following description is merely exemplary in nature and is not intended to limit the present disclosure, application, or uses. It should be understood that throughout the drawings, corresponding reference numerals indicate like or corresponding parts and features.

According to one aspect of the present disclosure, a method of controlling a power factor correction (PFC) converter that has a discontinuous input current and at least one switch includes sensing the input current and an output voltage of the converter. A duty cycle of the switch is controlled in response to the sensed input current and output voltage according to a predetermined control equation such that an average input current to the converter is substantially sinusoidal.

Some examples of PFC converters and systems configured for implementing the above method will now be described with reference to FIGS. 1-10. It should be understood, however, that a variety of other PFC converters and systems can also be used without departing from the scope of the present disclosure.

FIG. 1 is a diagram of an example PFC converter, generally indicated by reference numeral 100. The input of the converter is connected to a sinusoidal voltage source 102. The sinusoidal voltage is rectified by rectifier 104 and filtered by an input filter 106. The rectified and filtered voltage is input to a switching converter circuit 108 and an output voltage is provided to a load 110. A duty cycle of a switch in the converter circuit 108 is controlled by a controller 112. In this particular example, the controller 112 utilizes three inputs, a sensed input current, a sensed output voltage and a reference voltage, to apply a predetermined control equation to the operation of the converter circuit.

Figure 2:
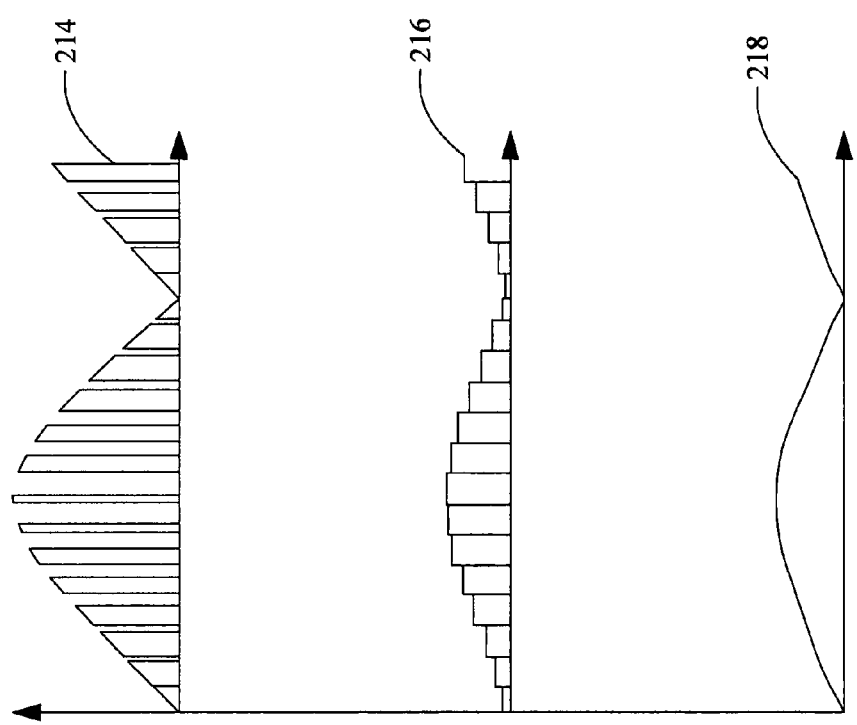
FIG. 2 is a graph of a chopped input current, an average input current and a filtered input current.

As illustrated graphically in FIG. 2, the switching converter circuit produces chopped input currents 214 because it is switched on and off at frequencies much higher than the frequency of the sinusoidal input voltage. As shown at 216, the controller 112 controls the converter 100 according to the predetermined control equation such that an average of the input current is sinusoidal. Applying a filter to the input current thus results in a substantially sinusoidal average input current 218.

The method described above produces a sinusoidal average input current. One example of a predetermined control equation for the switch which results in a sinusoidal average input current is:

$$M(D) \cdot \frac{1}{T_s} \int_0^{D(k) \cdot T_s} i(t)dt \cdot R_s = V_m \quad (1)$$

In equation 1, M(D) is a ratio of the output voltage to the input voltage. The duty cycle of the switch in a $k^{th}$ switching cycle is represented by D(k). An inductor current in the $k^{th}$ switching cycle is i(t). Ts is the switching period. Finally, $R_s$ is an input current sense resistance and $V_m$ is an amplified error voltage.

Equation (1) can be mathematically shown to produce a sinusoidal average input current. Because the converter operates at a high switching frequency, the average input current in the $k^{th}$ cycle, $i_{av}(k)$, can be represented by:

$$i_{av}(k) = \frac{1}{T_s} \int_0^{D(k) \cdot T_s} i(t)dt \quad (2)$$

Combining equations (1) and (2) results in a new equation:

$$M(D) \cdot i_{av}(k) \cdot R_s = V_m \quad (3)$$

Because M(D) is the ratio of output voltage, $V_o$, to input voltage, $V_{in}$, equation (3) can be rewritten as:

$$\frac{V_{in}}{i_{av}(k)} = \frac{V_o}{V_m} \cdot R_s \quad (4)$$

Additionally, the emulated input resistance, $R_e$, of a PFC converter is given by:

$$R_e = \frac{V_{in}}{i_{av}(k)} \quad (5)$$

Substituting equation (5) into equation (4) gives:

$$R_e = \frac{V_o}{V_m} \cdot R_s \quad (6)$$

Because $V_o$ and $V_m$ can be considered constant values and $R_s$ is a constant resistance, equation (6) shows that $R_e$ is a constant. Looking again at equation (5), if $R_e$ is a constant and the input voltage, $V_{in}$, is sinusoidal, the average input current, $i_{av}(k)$, must also be sinusoidal. Thus, equation (1) results in an average input current that is substantially sinusoidal.

Equation (1) can be manipulated into various forms depending on the topology of the PFC converter to be controlled. For example, in a buck converter, the ratio of the output voltage to the input voltage, M(D), is equal to the duty cycle of the buck switch in the $k^{th}$ cycle, D(k). Substituting into equation 1 gives the following control equation for a buck converter:

$$D(k) \cdot \frac{1}{T_s} \int_0^{D(k) \cdot T_s} i(t)dt \cdot R_s = V_m \quad (7)$$

While several example equations are provided above, it should be understood that other equations may be used to control a PFC converter in a manner that results in a substantially sinusoidal average input current without departing from the scope of this disclosure.

Figure 3:
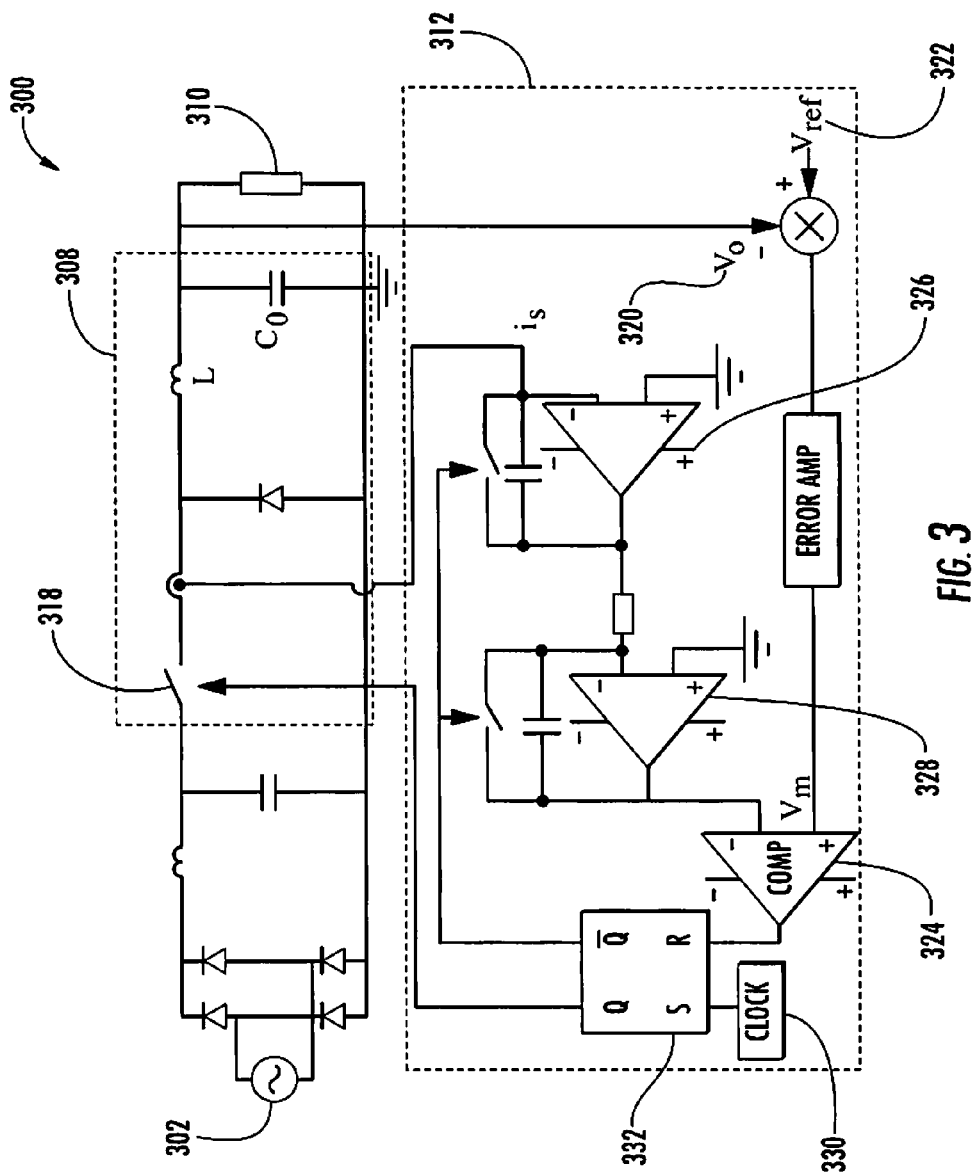
FIG. 3 is a diagram of an example PFC converter including a buck converter circuit and a control circuit operating according to a control equation such that an input current to the converter is sinusoidal.

FIG. 3 is another example of a PFC circuit 300 comprising a switching power converter 308 having an input current and producing an output voltage. The converter 308 includes a switch 318. The PFC circuit 300 also includes a control circuit 312 operable to control a duty cycle of the switch 318 according to a predetermined control equation such that an average of the input current is sinusoidal.

The power converter 308 is a buck converter. A buck converter receives a rectified input voltage from a voltage source 302 and provides an output voltage to a load 310. The output voltage is smaller in magnitude than the input voltage to the converter.

The control circuit 312 is configured to implement equation (1) in the buck converter form of equation (7). The control circuit 312 operates at a fixed frequency provided by a clock 330. The control circuit senses the input current and the output voltage in each switching cycle of the converter 308. The sensed output voltage 320 is subtracted from a reference voltage 322 and an amplified error voltage Vm is provided to a comparator 324. The amplified error voltage Vm is compared to the output of a pair of integrators 326, 328. The input to the first integrator 326 is the sensed input current. The output of the first integrator is input to the second integrator 328. Thus, the final output of the two integrators 326, 328 is the second integral of the sensed input current. This integration output is provided to the comparator 324 and compared with the amplified error voltage Vm. The output of the comparator 324 is provided to an SR flip flop 332 that controls the switch 318 and the integrators 326, 328.

At the beginning of a switching cycle, the switch 318 is turned on, i.e. closed, and the integrators 326, 328 are activated. The output voltage is sensed and subtracted from the reference voltage to provide the amplified error voltage Vm. The input current is sensed and integrated twice. The integration output is compared to the amplified error voltage Vm. When the integration output reaches the same magnitude as the amplified error signal, the comparator 324 triggers the flip flop 332. The flip flop 332 then turns off the switch 318 and resets the integrators 326, 328. The PFC circuit 300 remains in this state until the next clock cycle. When the clock provides the next clock signal, the cycle repeats.

The input to the integrators 326, 328 is actually a voltage representative of the input current. By Ohm's law, this sensed voltage equals the input current, $i_{pk}(k)$, times the sense resistance, $R_s$. The sense resistance is a constant. Therefore, the signal output from the two integrators 326, 328 is:

$$R_s \cdot \frac{1}{T_s^2} \cdot \int_0^{D(k) \cdot T_s} \left( \int_0^{D(k) \cdot T_s} i(\tau)d\tau \right) dt \quad (9)$$

Calculating the double integral in equation (9) shows the integration output to be:

$$R_s \cdot \frac{1}{T_s^2} \cdot \int_0^{D(k) \cdot T_s} \left( \int_0^{D(k) \cdot T_s} i(\tau)d\tau \right) dt = D(k) \cdot \frac{1}{T_s} \int_0^{D(k) \cdot T_s} i(t)dt \cdot R_s \quad (10)$$

The integration result in equation (10) is compared by the comparator 324 to the amplified error voltage $V_m$. At the time when the integration result equals the error voltage $V_m$, the integration result is:

$$D(k) \cdot \frac{1}{T_s} \int_0^{D(k) \cdot T_s} i(t)dt \cdot R_s = V_m \qquad (11)$$

As can be seen, equation (11) is the same as equation (7). Thus, the control circuit 312 implements the buck converter control equation (7). As described above, this will result in a substantially sinusoidal average input current.

Figure 4:
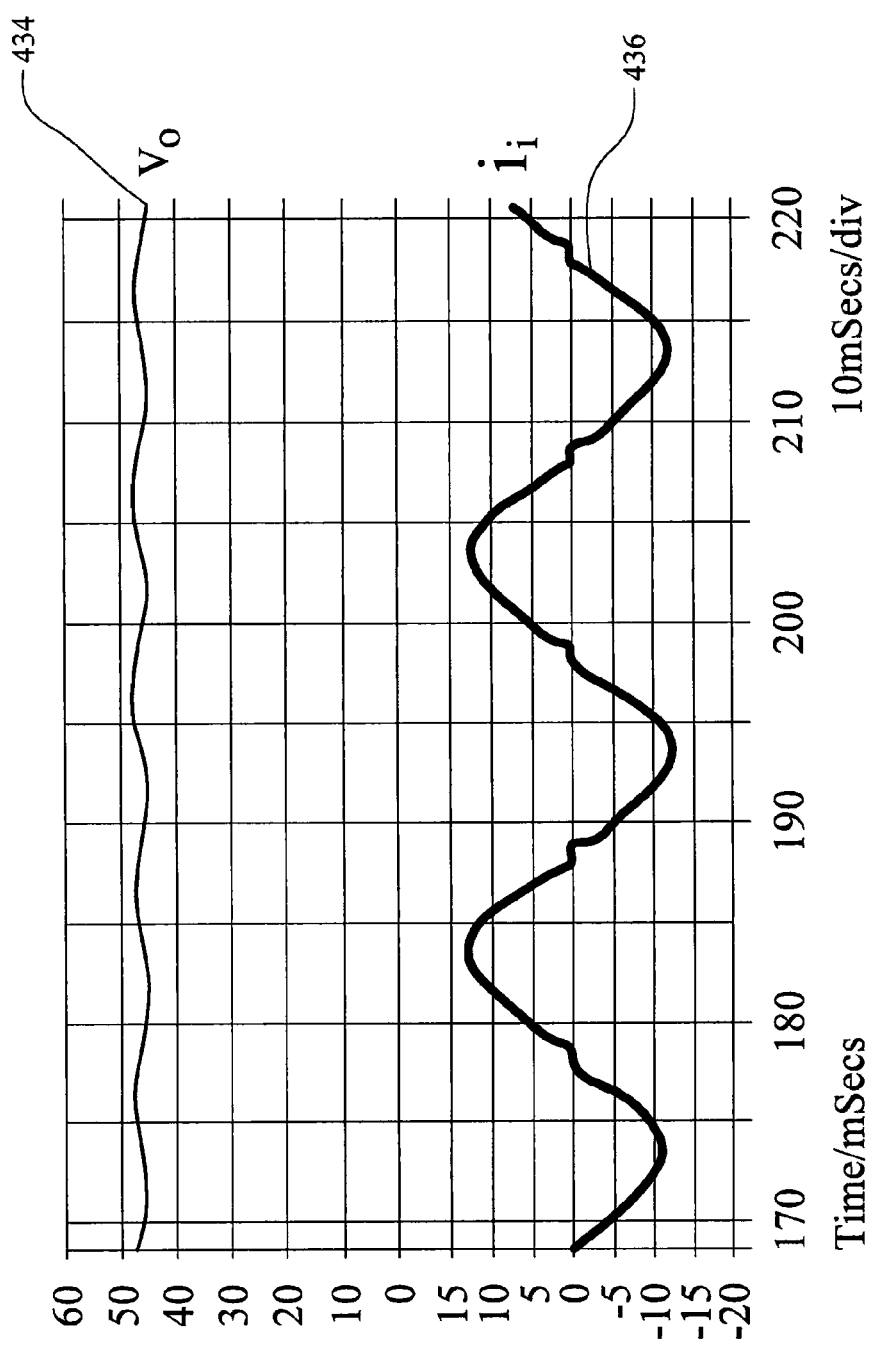
FIG. 4 is a graph of the simulated output voltage and input current of the PFC converter in FIG. 3.

FIG. 4 graphically illustrates the results of a computer simulation of the PFC circuit of FIG. 3. For the simulation, a 50 Hz, 220 volt input voltage was used. The switching frequency was set at 100 kHz and the output voltage was 46 volts DC. The output voltage is illustrated at 434, while the input current is illustrated at 436. As can be seen, the input current is sinusoidal. There is, however, a discontinuity or "dead angle" that occurs near the zeroes of the input current. This is caused by the operating characteristics of a buck converter. A buck converter only converts an input voltage to a lower output voltage. When the input voltage is below the output voltage, the dead angle occurs. This dead angle can be reduced, or eliminated, and an ideal sinusoidal input current approached, by using a buck-boost converter.

Figure 5A:
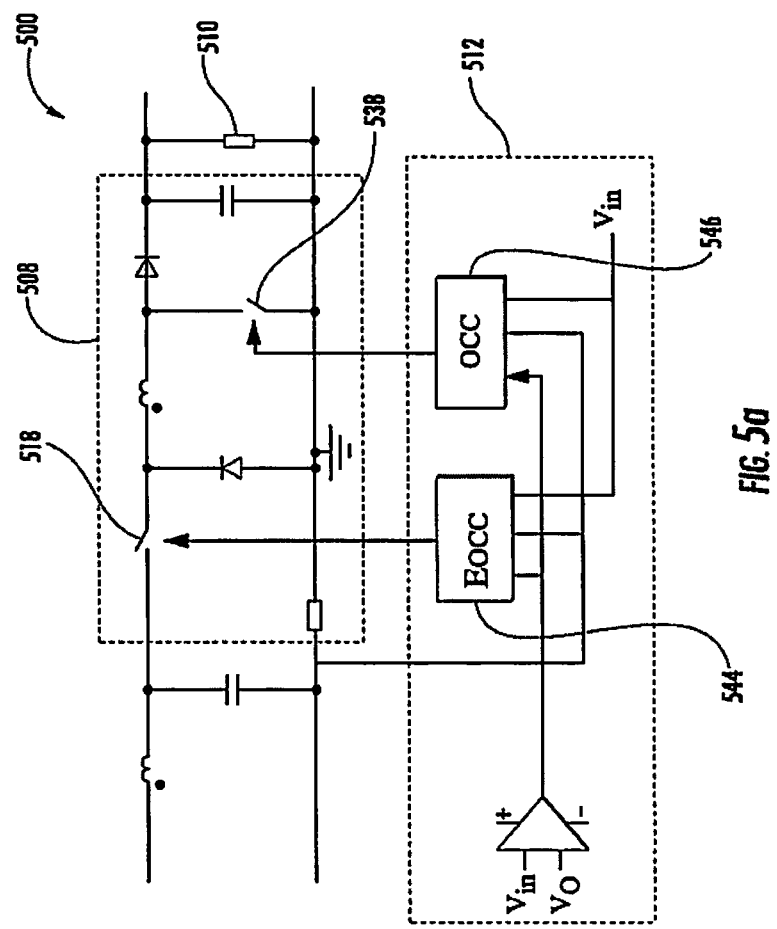
FIG. 5a is a block diagram of an example PFC converter including a buck-boost converter circuit and a control circuit operating according to a control equation such that an input current to the converter is sinusoidal.

Another example embodiment of a PFC circuit 500 is illustrated in FIG. 5a. The PFC circuit includes a switching power converter 508 having an input current and producing an output voltage. The converter includes a buck switch 518 and a boost switch 538. The PFC circuit also includes a control circuit 512 operable to control a duty cycle of the switch according to a predetermined control equation such that an average of the input current is sinusoidal.

Figure 5B:
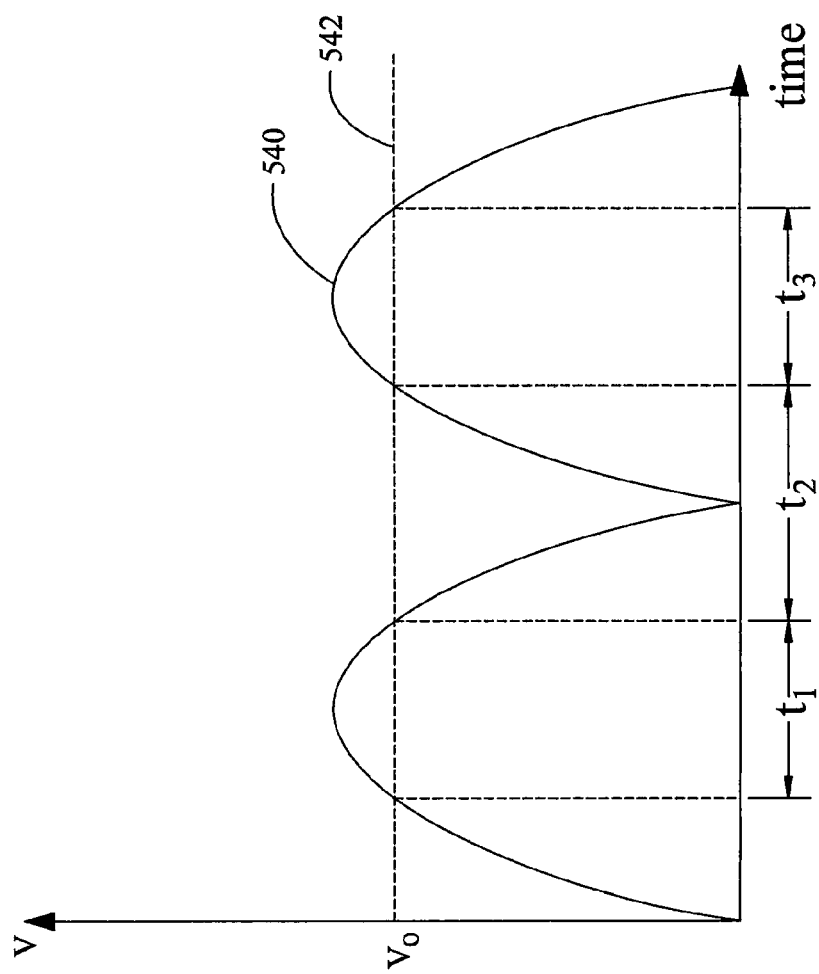
FIG. 5b is a graph of the rectified input voltage to the PFC converter of FIG. 5a illustrating the time periods during which the PFC converter operates as a buck converter and a boost converter.

The power converter 508 is a buck-boost converter. A buck-boost converter receives a rectified input voltage, illustrated as 540 in FIG. 5b, from a sinusoidal voltage source, not illustrated, and provides an output voltage 542 to a load 510. As can be seen in FIG. 5b, the rectified input voltage received from the sinusoidal voltage source varies in magnitude. When the input voltage is greater than the output voltage, such as during $t_1$ and $t_3$ in FIG. 5b, the buck-boost converter operates as a buck converter. When the input voltage is less than the output voltage, such as during $t_2$ in FIG. 5b, the buck-boost converter operates as a boost converter.

The controller 512 has two controller portions. The buck portion of the buck-boost converter is controller by a first controller 544, while the boost portion of the buck-boost converter is controller by a second controller 546. The first controller operates in the same manner as the controller 312 described above. The second controller is a boost controller and may operate according to aspects of the present disclosure or according to other methods well known to those skilled in the art, including a one cycle control (OCC) scheme.

Figure 6:
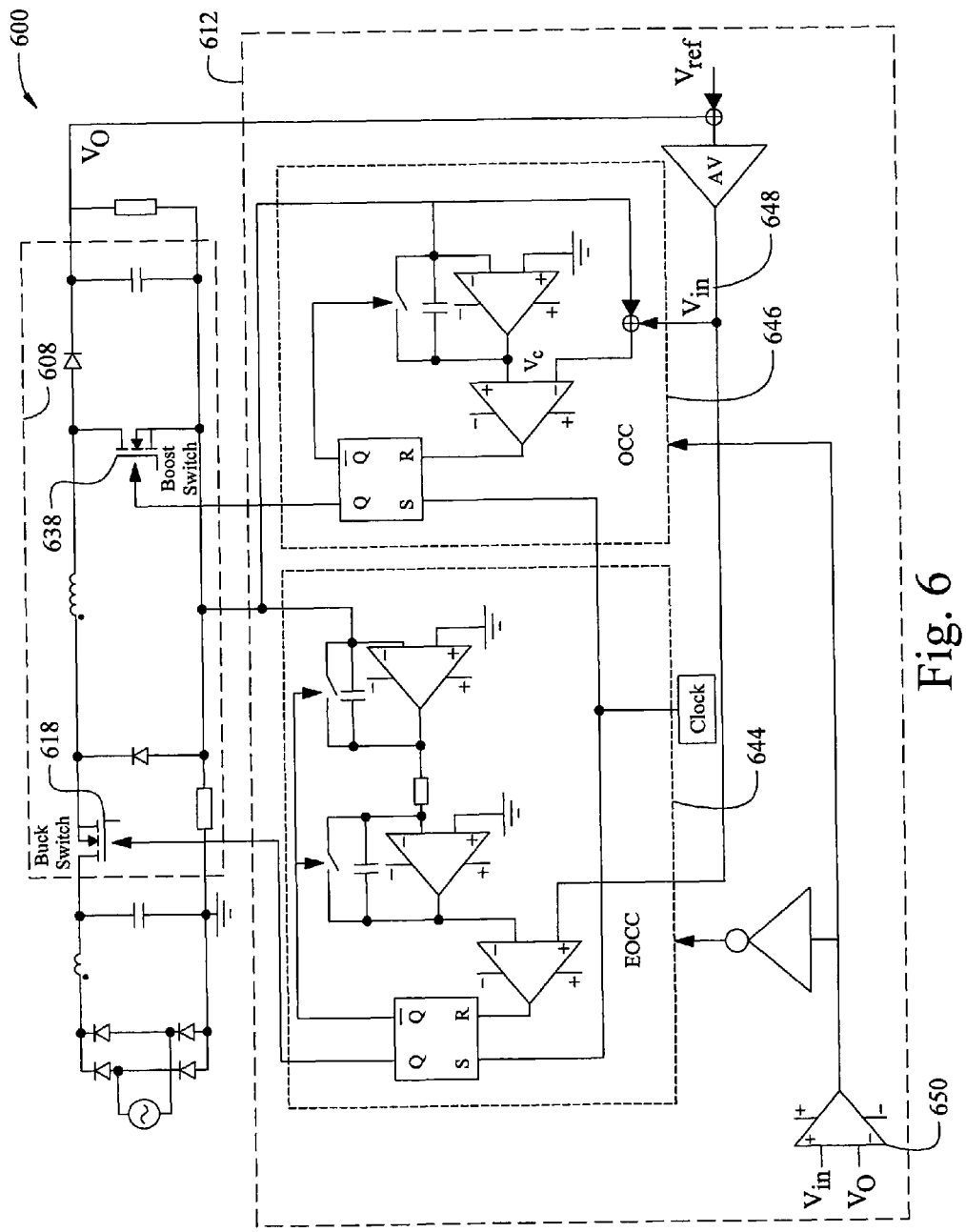
FIG. 6 is a diagram of an example PFC converter including a buck-boost converter circuit and a control circuit operating according to a control equation such that an input current to the converter is sinusoidal.

A more detailed diagram of a PFC circuit 600 is illustrated in FIG. 6. The PFC circuit includes a buck-boost power converter 608 having an input current and producing an output voltage. The converter includes a buck switch 618 and a boost switch 638. The PFC circuit also includes a control circuit 612 operable to control a duty cycle of the buck switch according to a predetermined control equation such that an average of the input current is sinusoidal.

In particular, the control circuit includes two control portions, 644 and 646, for separately controlling the buck switch and the boost switch. A first control portion 644 controls the buck switch according to the predetermined control equation as discussed above. The boost switch is controlled by the second control portion 646. Both the first control portion 644 and the second control portion 646 share the same amplified error voltage 648. A comparator 650 compares the input voltage and the output voltage. When the input voltage is greater than the output voltage, the comparator activates the first control portion and the first control portion controls the buck switch. Conversely, when the input voltage drops below the output voltage, the comparator deactivates the first portion and activates the second portion. The second control portion then controls the buck switch. By this control scheme, the output voltage is kept approximately constant and the input current approaches a pure sinusoid.

Figure 7:
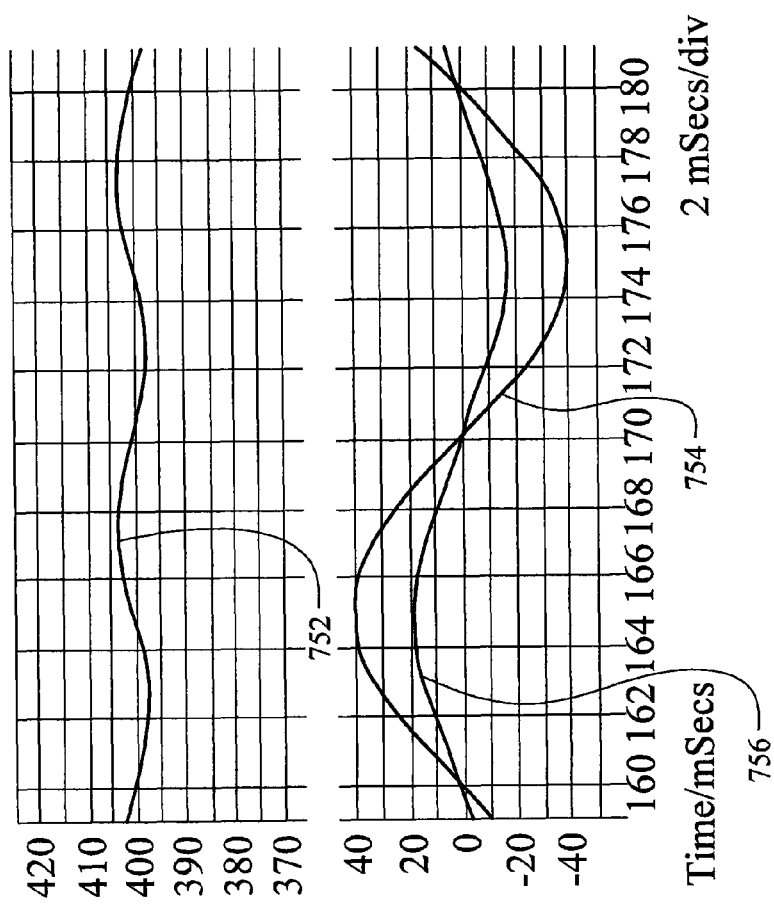
FIG. 7 is a graph of the simulated output voltage, input voltage and input current of the PFC converter in FIG. 6.

FIG. 7 graphically illustrates the results of a computer simulation of the PFC circuit of FIG. 6. For the simulation, 460 volt RMS input voltage was used. The output voltage was 400 volts DC. The output voltage is illustrated at 752, while the unrectified, unfiltered input voltage is illustrated at 754. The input current is illustrated at 756. As can be seen, the input current is sinusoidal and in phase with the input voltage. The input current is a much cleaner sinusoid than the input current 436 in FIG. 4. As can also be seen, there is a very smooth transition in the input current when the converter switches from buck to boost, and vice versa, operation.

Figure 8:
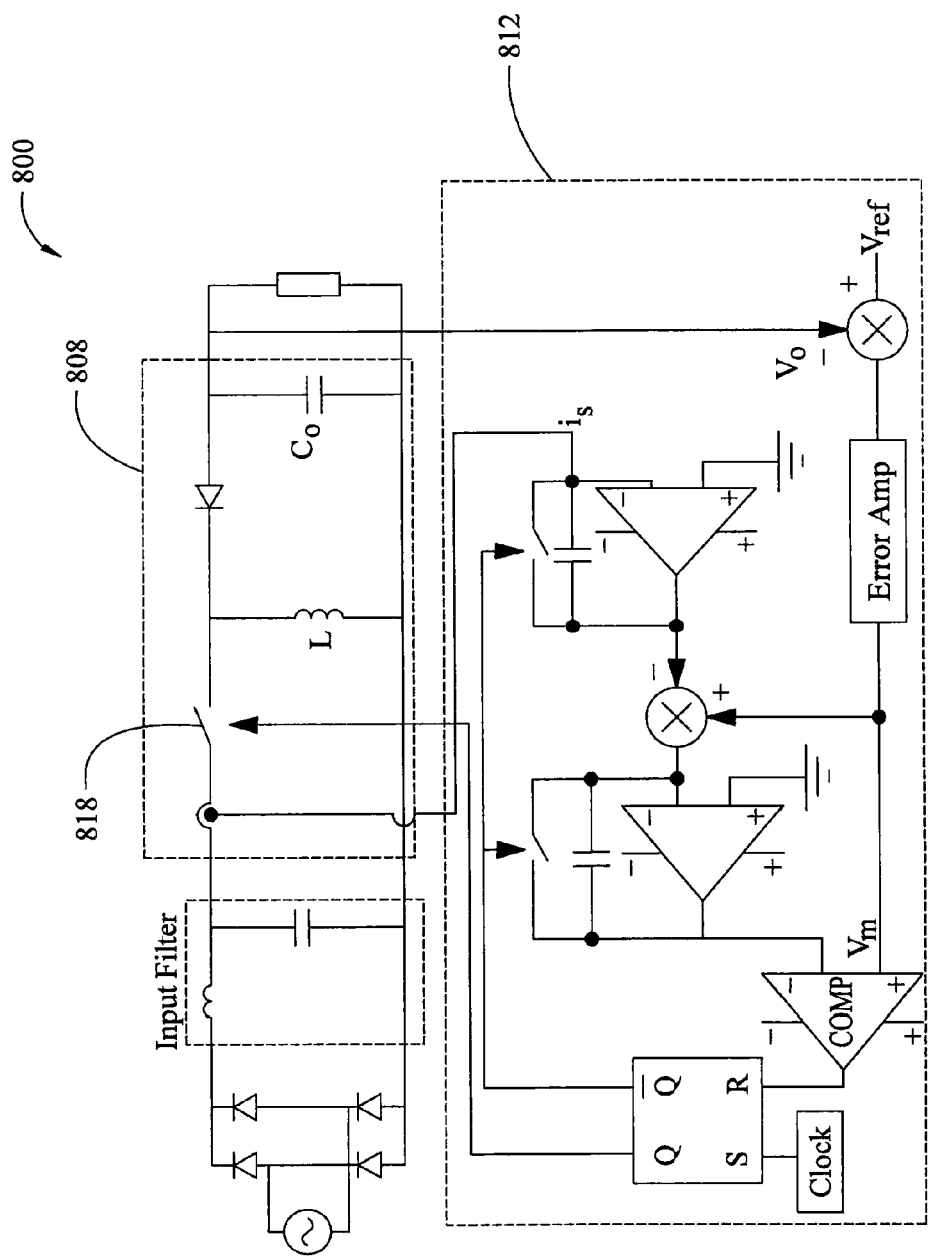
FIG. 8 is a diagram of an example PFC converter including a non-isolated flyback converter circuit and a control circuit operating according to a control equation such that an input current to the converter is sinusoidal.

Yet another embodiment of a PFC circuit 800 is illustrated in FIG. 8. The PFC circuit includes a switching power converter 808 having an input current and producing an output voltage. The converter includes a switch 818. The PFC circuit also includes a control circuit 812 operable to control a duty cycle of the switch according to a predetermined control equation such that an average of the input current is sinusoidal.

The switching power converter 808 is a non-isolated flyback converter. The operation of flyback converters are well known to those skilled in the art and will not be further discussed herein. To derive the appropriate control equation for the switching power converter, it is important to note that the ratio of the output voltage to the input voltage, M(D), for a non-isolated flyback converter whose switch has a duty cycle in the $k^{th}$ cycle of D(k) is given by:

$$M(D) = \frac{D(k)}{1 - D(k)} \qquad (12)$$

Substituting equation (12) into the general control equation (1) produces the control equation needed for the power converter 808:

$$\frac{D(k)}{1 - D(k)} \cdot \frac{1}{T_s} \int_0^{D(k) \cdot T_s} i(t)dt \cdot R_s = V_m \qquad (13)$$

Equation (13) can be transformed into (14)

$$D(k) \cdot \left[ \frac{1}{T_s} \int_0^{D(k) \cdot T_s} i(t)dt \cdot R_s + V_m \right] = V_m \qquad (14)$$

The control circuit 812 implements the control equation (14) in order to control the switch in the non-isolated flyback converter 808.

Figure 9:
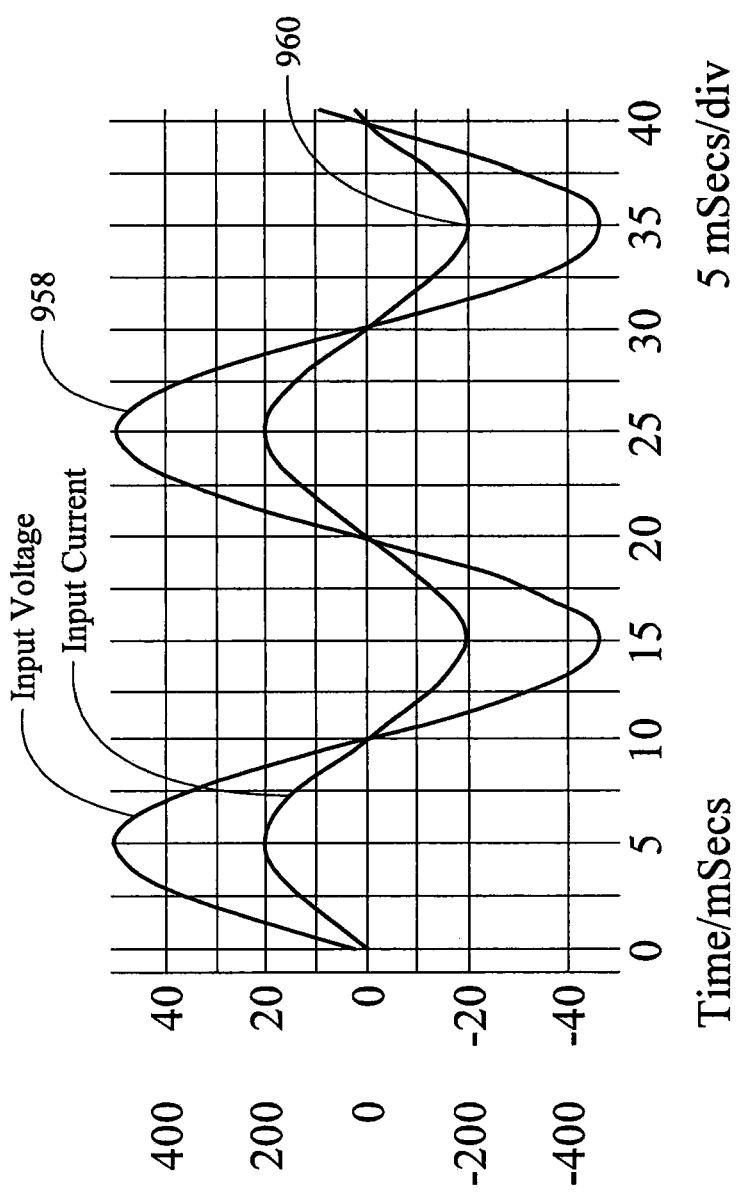
FIG. 9 is a graph of the simulated input voltage and input current of the PFC converter in FIG. 8.

FIG. 9 graphically illustrates the results of a computer simulation of the PFC circuit of FIG. 8. For the simulation, a 50 Hz, 350 volt input voltage was used. The switching frequency was set at 100 kHz and the output voltage was −380 volts DC. The unrectified, unfiltered input voltage is illustrated at 958. The input current is illustrated at 960. As can be seen, the input current is sinusoidal and in phase with the input voltage.

As mentioned above, a PFC converter is often used as the first stage of a multiple stage power supply. In such situations, the PFC converter's load is the input to another power converter. However, PFC converters can also be used as a single stage power supply. The ability to use a PFC converter as a single stage power supply depends on various factors, such as magnitude of the output voltage, current and output power requirements.

Figure 10:
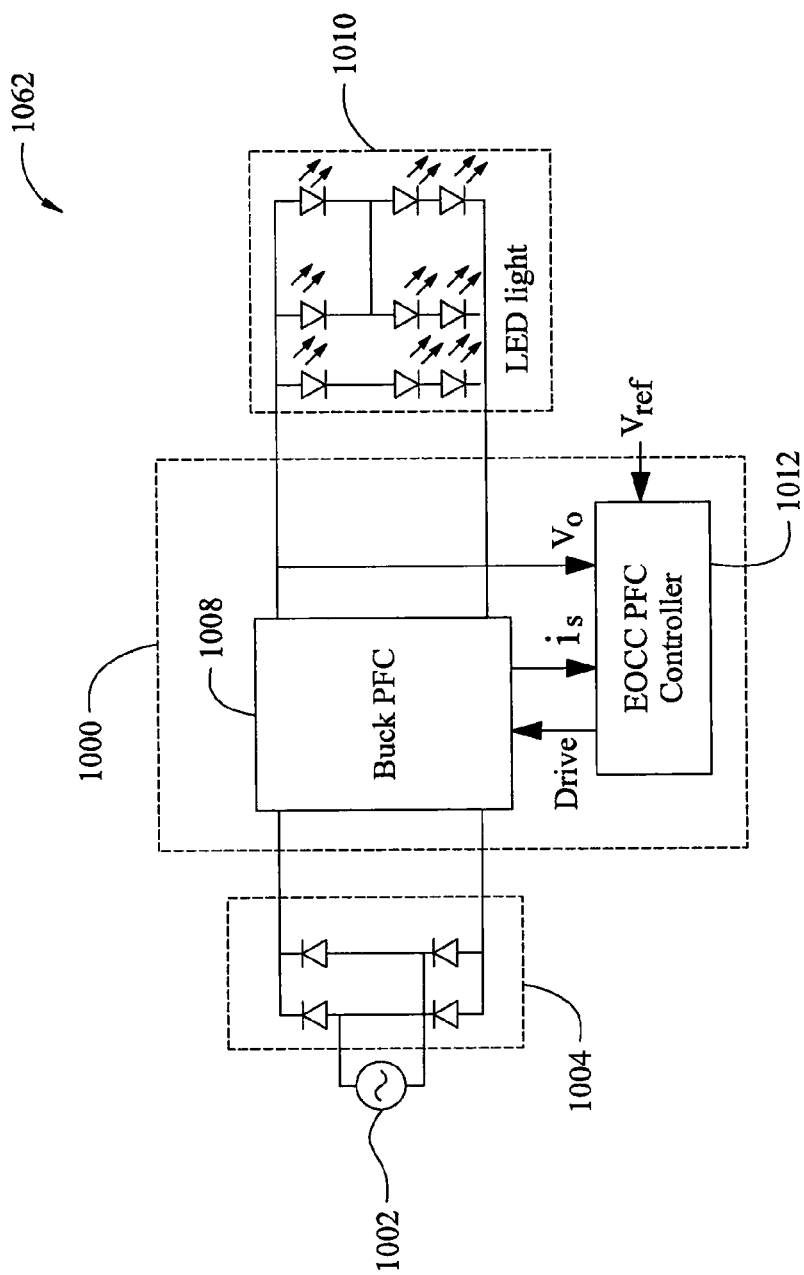
FIG. 10 is a block diagram of an example system for driving a group of LEDs, the system including a PFC converter having a buck converter circuit and a control circuit operating according to a control equation such that an input current to the converter is sinusoidal.

An example embodiment of a system 1062 in which a PFC converter 1000 used as a single stage power supply is illustrated in FIG. 10. The PFC converter in this particular embodiment includes a switching power converter 1008 having an input current and producing an output voltage. The converter includes a switch, not illustrated. The PFC circuit also includes a control circuit 1012 operable to control a duty cycle of the switch according to a predetermined control equation such that an average of the input current is sinusoidal.

The switching power converter 1008 is a buck converter. The converter and control circuit 1012 are similar to that disclosed in FIG. 3. A sinusoidal voltage source 1002 and a rectifier 1004 provide a rectified input voltage to the buck converter. The buck converter provides an output voltage to a load 1010. In this embodiment, the load is not another power converter, but a group of light emitting diodes (LEDs). This embodiment results in a single stage power supply producing the low DC voltage required for a group of LEDs while maintaining a sinusoidal input current.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as a required order of performance. It is also to be understood that additional or alternative steps may be employed.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method of controlling a power factor correction (PFC) converter that has a discontinuous input current, the method comprising:
   sensing the discontinuous input current;
   sensing an output voltage from the converter; and
   controlling a duty cycle of at least one switch in the converter in response to the sensed input current and output voltage according to a predetermined control equation such that an average input current to the converter is substantially sinusoidal, wherein the predetermined control equation is $$M(D) \cdot \frac{1}{T_s} \int_0^{D(k) \cdot T_s} i(t)dt \cdot R_s = V_m,$$

where M(D) is a ratio of the output voltage to an input voltage, D(k) is the duty cycle in a $k^{th}$ switching cycle, i(t) is an inductor current in the $k^{th}$ switching cycle, $T_s$ is switching period, $R_s$ is an input current sense resistance, and $V_m$ is an amplified error voltage.

2. The method of claim 1 wherein the PFC converter comprises a buck-boost converter.

3. The method of claim 2 wherein the switch in the converter controlled according to the control equation is a buck switch in a buck portion of the buck-boost converter.

4. The method of claim 3 wherein the PFC converter further comprises a boost controller for controlling a boost portion of the buck-boost converter.

5. The method of claim 4 further comprising controlling, with the boost controller, a duty cycle of a boost switch in the boost portion of the buck-boost converter.

6. The method of claim 1 wherein controlling the duty cycle includes integrating the discontinuous input current.

7. The method of claim 6 wherein controlling the duty cycle includes comparing the integrated discontinuous input current to an error voltage.

8. The method of claim 1 wherein the PFC converter comprises a buck converter and wherein M(D) is equal to D(k).

9. The method of claim 1 wherein the PFC converter comprises a flyback converter and wherein M(D) is equal to $$\frac{D(k)}{1 - D(k)}.$$

10. A power factor correction (PFC) circuit comprising:
    a switching power converter for producing an output voltage from an input current, the converter including at least one switch; and
    a control circuit operable to control a duty cycle of the switch according to a predetermined control equation such that the input current is discontinuous and an average of the discontinuous input current is substantially sinusoidal, the control circuit including a pair of integrators and a comparator, the pair of integrators configured to output a second integral of the input current, the comparator configured to compare the second integral of the input current with an error voltage representing a difference between the output voltage and a reference voltage.

11. The PFC converter of claim 10 further comprising a filter to transform the discontinuous input current into a sinusoidal input current.

12. The PFC converter of claim 11 wherein the switching power converter is a buck-boost converter.

13. The PFC converter of claim 12 wherein the switch is a buck switch and the control circuit is operable to control the duty cycle of the buck switch.

14. The PFC converter of claim 13 wherein the buck-boost converter includes a boost switch, further comprising a second control circuit operable to control a duty cycle of the boost switch.

15. The PFC converter of claim 11 wherein the switching power converter is a buck converter.

16. The PFC converter of claim 11 further comprising a voltage sensor for sensing the output voltage from the switching power converter.

17. The PFC converter of claim 11 further comprising a current sensor for sensing the discontinuous input current.

18. A power supply including the PFC converter of claim 11.

19. The PFC converter of claim 10 wherein the switching power converter comprises a flyback converter.

* * * * *